United States Patent
Kohler

[15] 3,640,586
[45] Feb. 8, 1972

[54] TACHOMETER AMPLIFIER
[72] Inventor: William H. Kohler, Worthington, Ohio
[73] Assignee: Abex Corporation, New York, N.Y.
[22] Filed: Mar. 9, 1970
[21] Appl. No.: 17,595

[52] U.S. Cl. ..................303/21 R, 188/181 C, 303/20, 303/21 EB, 317/5, 318/52, 324/161
[51] Int. Cl. ..........................................B60t 8/08, B60t 8/10
[58] Field of Search..........................188/181 C; 303/20, 21; 307/120; 317/5; 318/52; 322/31, 37; 324/161; 328/146; 340/263, 268

[56] References Cited

UNITED STATES PATENTS 3,500,190  3/1970  Michon..................................317/5 X
3,450,444  6/1969  Ballard................................303/21 EB
3,527,986  9/1970  Darrow........................................317/5

Primary Examiner—Milton Buchler
Assistant Examiner—Stephen G. Kunin
Attorney—Kinzer, Dorn & Zickert

[57] ABSTRACT

A tachometer amplifier for an antiskid brake system controlling skid conditions on a plurality of vehicle axles which includes circuitry receiving signals from a plurality of tachometer pickups, one on each wheel. The amplifier compensates for difference in wheel diameters due to wear by tracking the signal voltages of the pickups and adjusting same to produce equal voltage signals out for equal speeds, and thereby permit skid detection during braking based on a difference in wheel speed.

12 Claims, 3 Drawing Figures

TACHOMETER AMPLIFIER

This invention relates in general to an antiskid brake system for vehicles where the speeds of the vehicle's wheels or axles are compared during braking and a skid condition is detected when the speeds differ, and more particularly to a system including comparing the wheel or axle speeds just prior to brake application and adjusting their speeds in the system control to make them equal to compensate for difference in wheel diameters caused by wear.

Heretofore, antiskid brake systems have generally been of the "deceleration" detection types where brake control responds to a predetermined wheel or axle deceleration rate. The tachometer amplifier of the invention is not necessary or usable in a deceleration detection system, but it is necessary in a system dependent upon detecting a difference in wheel or axle speeds. Where it not for the present invention which is capable of compensating for differing wheel diameters, the antiskid brake system might detect wheel differences and cause brake release where no skid condition exists, thereby prevention the most effective brake usage with such a system.

The present invention is especially useful in antiskid brake systems utilized with railway cars, such as a rapid transit vehicle, although it should be appreciated that it could be used on other vehicles such as automotive or aircraft vehicles. Because of wheel diameter difference in railway stock due to wear, it is important that the difference be considered where an antiskid brake system is employed with the railway stock. The tachometer amplifier of the present invention enables the consideration of differences in wheel diameter thereby providing a more efficient antiskid brake system.

In general, an antiskid brake system utilizing the tachometer amplifier of the invention includes tachometer pickups on each axle or wheel detecting wheel speed and producing a signal voltage for the tachometer amplifier. The signal voltage of all wheels and axles are compared and adjusted so that the wheel speed signal voltage of each wheel or axle is equal and thereafter utilized in detecting skid conditions. Equal signal voltages are received by an antiskid control which utilizes the signal voltage representing the highest wheel or axle speed as a reference signal for comparison with the other signal voltages, and upon detection of a difference in the reference signal voltage and one of the other signal voltages which represents a skid condition, an error signal is generated for producing an output to release the brakes on the skidding wheel or axle. Accordingly, it is important that the tachometer amplifier of the invention track and wheel or axle speeds so that all wheel or axle speeds are equal for comparison even where wheel diameters differ.

It is therefore an object of the present invention to provide a tachometer amplifier for an antiskid brake system that compensates for differences in wheel diameter due to wear.

Another object of this invention is in the provision of a wheel speed tracking unit for an antiskid brake system which permits skid detection by a difference in wheel speed to control the brakes.

Other objects, features and advantages of the invention will be apparent from the following detailed disclosure, taken in conjunction with the accompanying sheets of drawings, wherein like reference numerals refer to like parts, in which.

Figure 1:
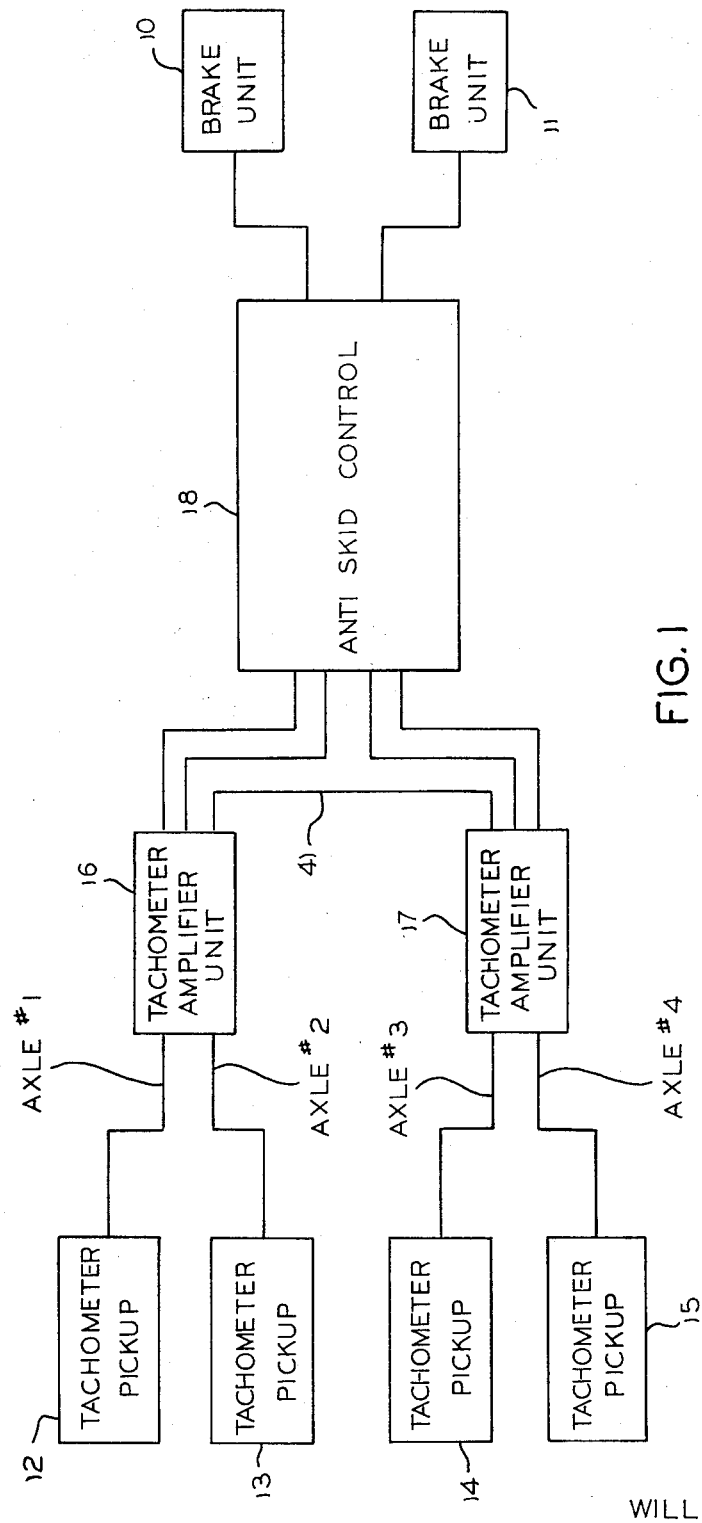
FIG. 1 is a block diagram of an antiskid brake system employing the tachometer amplifier of the invention which compensates for wheel diameter differences caused by wear.

The block diagram of FIG. 1 is intended to illustrate the use of the tachometer amplifier of the invention in a typical antiskid brake system, although it should be appreciated that it could be employed in any suitable system where brake release responds to vehicle wheel speed or wheel velocity detection rather than wheel deceleration rate. It should be recognized that other features might be included in the antiskid brake system generally illustrated in FIG. 1, but such have been omitted for purposes of simplicity since the invention resides only in the tachometer amplifier. The diagram diagram of FIG. 1 is intended to illustrate the application of an antiskid brake system to railway stock having a pair of trucks with a pair of axles supported by each truck. A brake unit would be mounted on each truck for substantially simultaneously applying or releasing brakes for all of the wheels or axles of that truck. Accordingly, brake units 10 and 11 are illustrated in connection with the antiskid brake system. The brake unit 10 would control the brakes on one of the trucks while the brake unit 11 would control the brakes on the other truck.

For the brakes on the truck controlled by the brake unit 10, tachometer pickups 12 and 13, one for each axle, are provided to produce a voltage having a frequency of which is directly proportional to the speed of the axle. Similarly, for the brake unit 11, tachometer pickups 14 and 15 are provided. The tachometer pickups may be of any desired type such as a gear tooth tachometer pickup, many of which are commercially available.

The outputs of tachometer pickups 12 and 13 are received by a tachometer amplifier unit 16, while the outputs of tachometer pickups 14 and 15 are received by a tachometer amplifier unit 17. Each tachometer amplifier unit includes two independent tachometer circuits, one for each tachometer pickup and axle. The tachometer amplifier units coact to compare the voltage signals from each of the tachometer pickups just prior to a brake application so that they may be adjusted to be made equal. The tachometer pickup signal voltages are received from the tachometer amplifier units 16 and 17 by an antiskid control 18 which compares the speeds of each axle with a reference speed that is the actual speed of the fastest axle. A difference in speed between one of the axles and the reference will produce an output for an appropriate brake unit 10 or 11 to release the brakes on the truck having the skidding axle.

Figure 2:
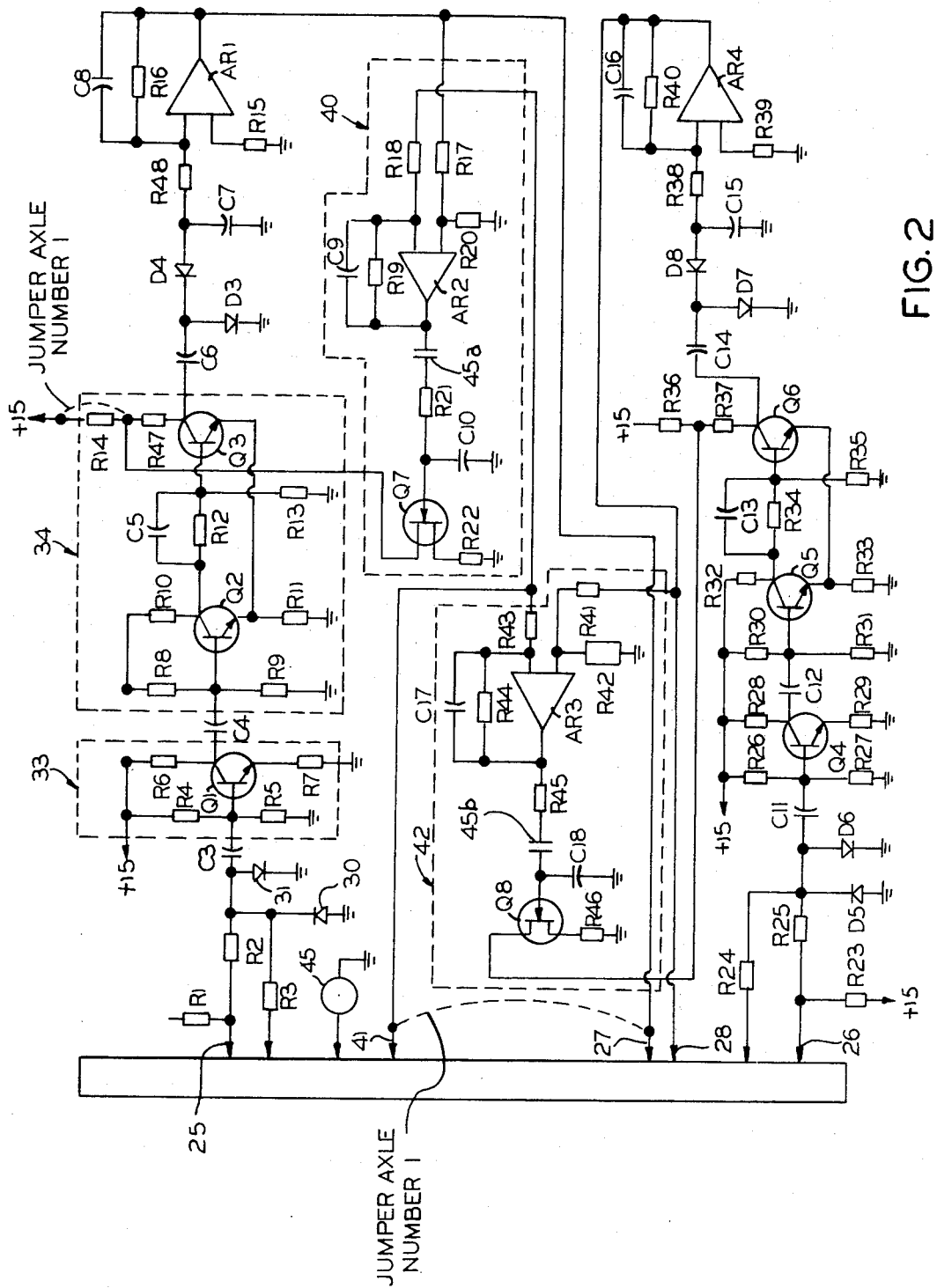
FIG. 2 is a detailed electrical schematic diagram of the tachometer amplifier of the invention.

The detailed circuitry for one of the tachometer units is shown in FIG. 2. Except for circuit connections hereinafter referred to and variations, the circuitry for each of the tachometer amplifier units will be the same. The only difference relates to that part of the circuitry for a reference axle, which may be axle No. 1. Accordingly, the schematic diagram shown in FIG. 3 will generally represent the tachometer amplifier unit 17 for axles 3 and 4. The circuitry within the amplifier unit includes a tachometer amplifier for axle No. 3 and a tachometer amplifier for axle No. 4, and accordingly, since these are the same, only the circuitry for axle No. 3 will be explained in detail. The input for axle No. 3 is designated at 25, while the input of axle No. 4 is designated at 26, while the output for axle No. 3 is designated at 27 and the output for axle No. 4 is designated at 28. The inputs are connected to the respective tachometer pickups, while the outputs are connected to the antiskid control.

Relating now to the tachometer amplifier circuitry for axle No. 3, a voltage signal varying in amplitude and frequency in accordance with the speed of axle No. 3, received by the input 25 is limited to plus and minus one-half volts by diodes 30 and 31. The resulting pulse is then amplified by the amplifier 33 and fed to a Schmitt trigger 34. The square wave output generated by the Schmitt trigger 34 is differentiated to produce a pulse of constant energy content which is time averaged and fed to the input of amplifier AR1 which amplifies the pulse. A direct current voltage output is delivered from amplifier AR1 that is proportional to the frequency of the incoming pulses. Comparison of the speed voltages for all axles is accomplished by comparing the tachometer voltages to that of axle No. 1 just prior to a brake operation, wherein the tracking of the speed voltages is done by adjusting the gains to make them equal. Amplifier AR2 performs the voltage comparison function, comparing the speed voltage of axle No. 1 with the speed voltage of axle No. 3, and if they are not the same, changes the amplitude of the pulse out of the Schmitt trigger 34, which is fed to amplifier AR1.

The diode regulated input is fed to the base of transistor Q1 through coupling capacitor C3. The base of transistor Q1 is biased to a positive voltage by resistors R4 and R6. The voltage signal fed to transistor Q1 turns Q1 on or partly off. The transistor Q1 serves only to amplify the input signal and the output wave form is either sine wave or clipped sine wave.

The output from the amplifier 33 is taken from the collector of the transistor Q1 and fed through coupling capacitor C4 to the base of transistor Q2, the latter of which coacts with transistor Q3 to form a switching circuit in the Schmitt trigger 34. Transistor Q2 is normally biased on by resistors R8 and R9. As the output of transistor Q1 goes negative, it starts to turn transistor Q2 off. Transistor Q3 is normally off, and as transistor Q2 turns off, it turns transistor Q3 on. Resistor R11 produces a feedback from Q3 to Q2 which turns transistor Q2 off more as transistor Q3 turns on, thereby providing a sharp turnoff for transistor Q2.

Transistor Q2 and Q3 making up the Schmitt trigger 34 generate a square wave which is differentiated by capacitor C6 to produce a pulse of energy output which is proportional to the change in voltage on the collector of transistor Q3. The differentiated output of the Schmitt trigger 34 is rectified by diode D4.

The voltage on capacitor C7 represents the average of frequency of pulses and discharges through resistor R48. Thus, time averaging of the pulses is accomplished by capacitor C7 to produce a direct current signal voltage proportional to the pulse frequency of the tachometer pickup. Amplifier AR1 merely amplifies this signal voltage and then feeds it to the comparison and gain adjusting circuit 40.

It should again be noted at this point the tachometer amplifier board shown in FIG. 2 and including a tachometer amplifier for axle No. 3 and a tachometer amplifier for axle No. 4 will not take the exact same configuration as the tachometer amplifier board serving axles No. 1 and 2. The speed voltages of axles No. 2, 3 and 4 are compared to that of axle No. 1, and therefore, the tachometer amplifier for axle No. 1 will not include a comparison and gain adjusting circuit such as 40. Further, resistor R14 is eliminated in the tachometer amplifier for less than that for the other axles, and this may be accomplished by jumping the resistor R14 in the axle No. 1 circuitry. Moreover, on the tachometer amplifier board including the axle No. 1 circuitry, a jumper is applied across the output from the tachometer amplifier board for axle No. 1 and the comparison line 41 which feeds the speed voltage signal of axle No. 1 into the comparison and gain adjusting circuits of axles No. 2, 3 and 4. Relative to the tachometer amplifier board for axles 3 and 4, it will be seen that the comparison line 41 for the speed signal of axle No. 1 is fed into the comparison and gain adjusting circuit 40 for axle No. 3, and is also fed into the comparison and gain adjusting circuit 42 for axle No. 4. Likewise, the speed signal for axle No. 1 would be fed into the comparison and gain adjusting circuit on the other tachometer amplifier board for axle No. 2.

Relay 45 is energized at the initiation of a brake command to close contacts in the comparison and gain adjusting circuits to operate same and adjust the gains for axles No. 2, 3 and 4 relative to axle No. 1 so that all speed voltages are equal prior to functioning of the antiskid control 18, thereby compensating for any difference in wheel diameters due to wear. Contacts 45a are closed in response to the energization of relay 45 in the comparison and gain adjusting circuit 40 of axle No. 3, while contacts 45b are closed in the comparison and gain adjusting circuit 42 of axle No. 4. Similarly, contacts would be closed in the comparison and gain adjusting circuit for axle No. 2. Inasmuch as the comparison and gain adjusting circuit 40 is identical to that of circuit 42, only the details of circuit 40 will be hereinafter described, it being understood that they do not differ for the circuit 42. Similarly, the circuitry for axle No. 4 converting the input to a direct current output proportional to the frequency is the same as shown.

The comparison and gain adjusting circuit 40 includes generally a comparison amplifier AR2 which compares the speed signal voltage of axle No. 1 with that of axle No. 3, and where a difference is detected, causes operation of the field effect transistor Q7 to adjust the amplitude of the pulse out from the Schmitt trigger 34. The speed signal voltage of axle No. 1 is fed in on input line 41 to amplifier AR2 through input line 46, while the speed signal voltage of axle No. 3 is fed from the output of amplifier AR1 to the input line 47 of the comparison amplifier AR2. Where there is a difference in these speed signal voltages, plus or minus, the output of the comparison amplifier AR2 will likewise charge or discharge capacitor C10. The only discharge path for capacitor C10 is through field effect transistor Q7 and resistor R22. Resistor R22 limits the maximum swing, which may be adjusted to which may be adjusted to ± 10 percent of the voltage of axle No. 1. The magnitude or amplitude of pulse from transistor Q3 in the Schmitt trigger 34 is dependent upon the voltage at the junction of resistor R14 and R47. The drain of field effect transistor Q7 is connected to this junction. The field effect transistor Q7 normally conducts depending upon the charge of capacitor C10, and it will conduct more or less depending on the voltage on the gate. Accordingly, the voltage on the gate of field effect transistor Q7 is dependent upon the charge on capacitor C10, which is in turn dependent upon the difference between the voltage outputs of axles No. 1 and 3. The gain of amplifier AR2 maintains the field effect transistor normally conducting, which conduction state will increase or decrease depending upon the charge of capacitor C10. Because of the gain of amplifier AR2, there is always a charge on capacitor C10, which charge increases or decreases as effected by the difference in voltages of axles No. 1 and 3. When contacts 45 are opened, capacitor C10 holds this charge because of the extremely high impedance of field effect transistor Q7. It can be appreciated that field effect transistor Q7 acts as a voltage variable resistor, wherein the change in the resistance of transistor Q7 changes the amplitude of the pulse out of the Schmitt trigger 34, therefore changing the energy content of each pulse. This automatic gain adjustment for the tachometer amplifiers forces the tachometer pickups to track regardless of wheel wear.

Figure 3:
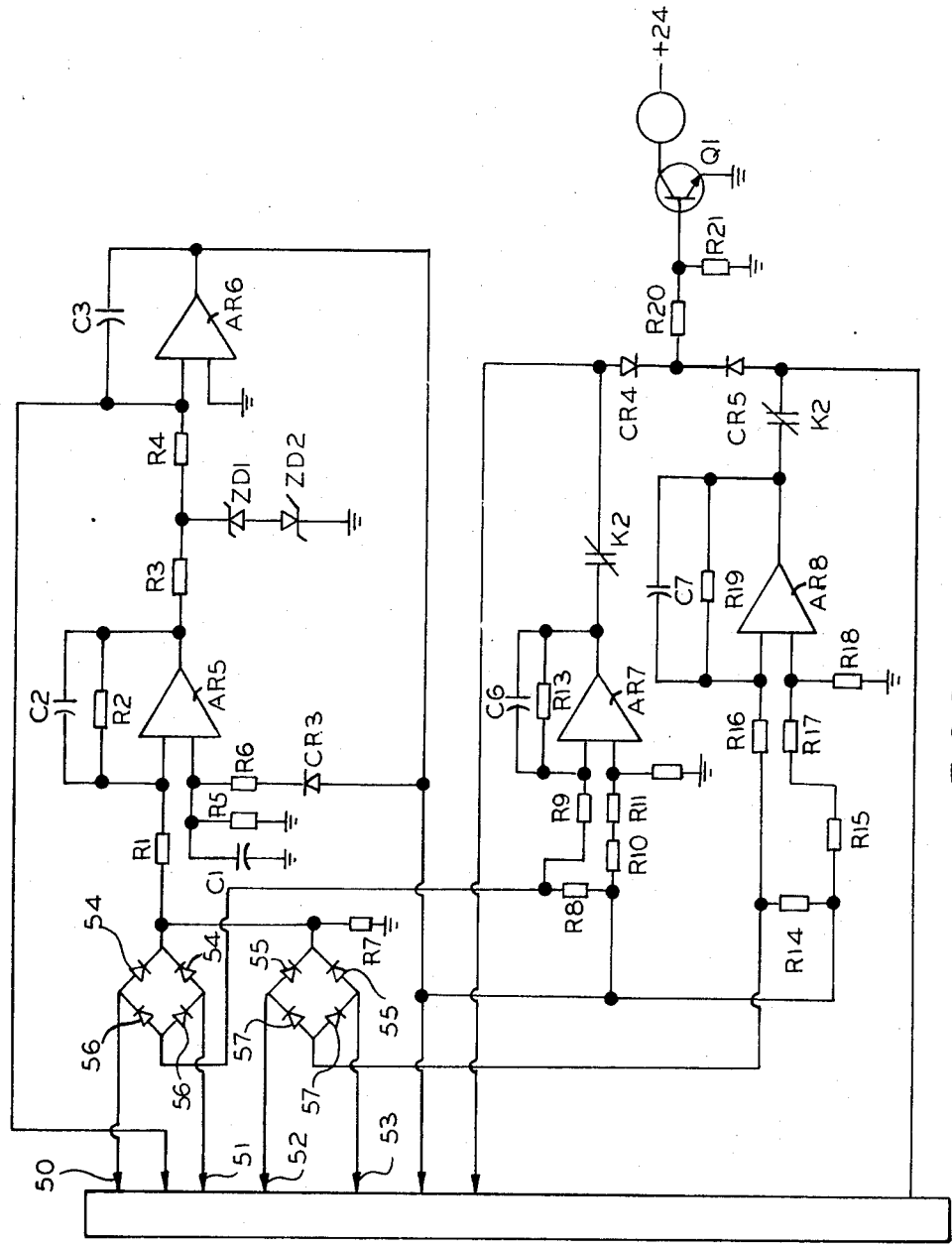
FIG. 3 is an electrical schematic diagram of the antiskid control utilized in the illustrated antiskid brake system.

The detailed circuitry for the antiskid control 18 is generally shown in FIG. 3. Although this circuitry does not comprise any part of the invention, it will be generally explained in relation to the operation of the overall antiskid brake system.

The outputs from the tachometer amplifiers representing the speed voltages of each of the axles are fed into terminals 50, 51, 52 and 53, which go through a diode OR gate consisting of diodes 54 and 55. Any one or all of the inputs will determine the voltage at resistor R1 which is the input to a ramp generator consisting of amplifiers AR5 and AR6. Amplifier AR5 is a high-gain differential amplifier which compares the output of amplifier AR6, the latter of which establishes the reference speed voltage, with the output of the OR gate, which is the actual speed of the fastest axle of all four axles. The amplified difference of the two signals constitutes the input to amplifier AR6 which is an integrator having an output equal to $$\frac{-1}{RC} \int EAR5.$$

The maximum slope of the output of integrator AR6 is set by R3, C3, and the zener limited voltage of AR5. Comparison amplifier AR3 compares the reference speed voltage with the actual speed voltages of axles 1 and 2, while the comparison amplifier AR4 compares the reference speed voltage with the actual speed voltages of axles 3 and 4. The reference speed voltage is fed from integrator AR6 as one input into comparison amplifiers AR7 and AR8, the other inputs for these amplifiers coming from the diode OR gates consisting of diodes 56 and 57 through which the axles speed voltages are received. A detected difference in speed between one of the axles and the reference will cause an output in the appropriate amplifier AR7 or AR8, which is fed to the control of either brake unit 10 or brake unit 11 for controlling the brake action. Accordingly, amplifier AR5 receives the output of integrator AR6 as determined by the coaction of resistor R4 and capacitor C3, and the output of the OR gate through resistor R1. Integrator AR6 tracks the voltage of resistor R1.

It will be understood that modifications and variations may be effected without departing from the scope of the novel concepts of the present invention.

This invention is hereby claimed as follows:

1. In an antiskid brake system for a vehicle including a tachometer pickup for each wheel or axle for producing a speed voltage having a frequency directly proportional to the speed of the wheel or axle, a plurality of tachometer amplifiers one for each pickup to receive the output therefrom, an antiskid control receiving the outputs of each tachometer amplifier for comparing the speed voltages during braking to detect a skid condition based upon a difference in wheel or axle speed, and brake units having controls responding to the output of the antiskid control, the improvement in said tachometer amplifiers each of which includes means for amplifying the input signal from the respective pickup and converting it to a direct current speed voltage output proportional to the frequency of the respective input signal, each of said tachometer amplifiers except one including a comparison and gain adjusting means for automatically and continuously adjusting the speed voltage outputs thereof in response to each initiation of a brake command to equal that of said one tachometer amplifier, and said comparison and gain adjusting means of a tachometer amplifier including means comparing the speed voltage output thereof with that of said one tachometer amplifier and compensating for differences in wheel diameter due to wear by adjusting the gain thereof so that its speed voltage output is equal to that of said one tachometer amplifier.

2. The combination as defined in claim 1, and means responsive to the initiation of a brake command for activating the comparison and gain adjusting means of each tachometer amplifier to adjust the gains thereof.

3. The combination as defined in claim 1, and diode limiting means for limiting the input signal amplitude.

4. The combination as defined in claim 3, wherein said amplifying and converting means includes an amplifier for amplifying the input signal, means for receiving the amplified input signal and producing a square wave output, means for differentiating the square wave output, means for rectifying the differentiated square wave output, means for time averaging the rectified voltage, and means for further amplifying the time averaged voltage.

5. The combination as defined in claim 4, wherein said square wave output producing means comprises a Schmitt trigger.

6. The combination as defined in claim 5, wherein said time averaging means includes a capacitor ahead of said further amplifying means.

7. The combination as defined in claim 6, wherein each comparison and gain adjusting means includes a comparison amplifier receiving as one input the speed voltage output from the amplifying and converting means of said one tachometer amplifier and as another input the speed voltage output of a respective amplifying and converting means, and means responding to the output of the comparison amplifier to change the amplitude of the pulse out of the Schmitt trigger if the comparison amplifier detects a difference in its inputs.

8. The combination as defined in claim 7, wherein said amplitude changing means includes a field effect transistor having its drain connected to the Schmitt trigger.

9. The combination as defined in claim 8, wherein a capacitor receives the output of the comparison amplifier and discharges through the gate of the field effect transistor and a gate to control the conduction of the transistor.

10. The combination as defined in claim 7, wherein each comparison and gain adjusting means includes a comparison amplifier receiving as one input the speed voltage output from the amplifying and converting means of said one tachometer amplifier and as another input the speed voltage output of a respective amplifying and converting means, and means responding to the output of the comparison amplifier to change the amplitude of the pulse out of the Schmitt trigger if the comparison amplifier detects a difference in its inputs.

11. The combination as defined in claim 10, wherein said amplitude changing means includes a field effect transistor having its drain connected to the Schmitt trigger.

12. The combination as defined in claim 11, wherein a capacitor receives the output of the comparison amplifier and discharges through the gate of the field effect transistor and a gate to control the conduction of the transistor.

* * * * *